(12) United States Patent (10) Patent No.: US 12,595,061 B2
Fiumara (45) Date of Patent: Apr. 7, 2026

(54) MODULAR POWER BOX MOUNTING SYSTEM

(71) Applicant: B/E Aerospace, Inc., Winston-Salem, NC (US)

(72) Inventor: Samuel J. Fiumara, King, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 0 days.

(21) Appl. No.: 18/663,490

(22) Filed: May 14, 2024

(65) Prior Publication Data

US 2025/0353598 A1 Nov. 20, 2025

(51) Int. Cl.
| *B64D 11/06* | (2006.01) |
| *B64D 11/00* | (2006.01) |
| *H02G 3/08* | (2006.01) |
| *H02G 3/12* | (2006.01) |

(52) U.S. Cl.
CPC ...... *B64D 11/0624* (2014.12); *B64D 11/0015* (2013.01); *H02G 3/08* (2013.01); *H02G 3/125* (2013.01)

(58) Field of Classification Search
CPC ........... B64D 11/0624; B64D 11/0015; H01R 2201/26; H01R 13/73; H02G 3/125; H02G 3/08
USPC ...................................................... 248/205.1
See application file for complete search history.

(56) References Cited

U.S. PATENT DOCUMENTS

| 3,623,683 | A | * | 11/1971 | Bennett | .................. | B64D 11/00 244/122 A |
| 5,405,111 | A | * | 4/1995 | Medlin, Jr. | ............ | H02G 3/125 248/906 |
| 5,409,186 | A | * | 4/1995 | Chow | ................ | B64D 11/0696 165/41 |
| 5,786,995 | A | * | 7/1998 | Coleman | ................ | B64D 11/00 700/83 |
| 6,038,426 | A | * | 3/2000 | Williams, Jr. | ... | B64D 11/00155 725/77 |
| 6,513,756 | B1 | | 2/2003 | Lambiaso | | |
| 6,585,189 | B1 | * | 7/2003 | Smallhorn | ......... | H05K 7/20145 244/119 |
| 6,619,588 | B2 | * | 9/2003 | Lambiaso | .......... | B64D 11/0696 244/118.6 |
| 6,644,593 | B2 | | 11/2003 | Lambiaso | | |
| 6,824,104 | B2 | * | 11/2004 | Smallhorn | ......... | B64D 11/0015 244/118.6 |
| 7,143,978 | B2 | * | 12/2006 | Smallhorn | ............. | B64D 11/06 297/217.3 |
| 8,464,982 | B2 | * | 6/2013 | Raybell | .................. | B64D 11/06 244/118.6 |

(Continued)

*Primary Examiner* — Taylor Morris
(74) *Attorney, Agent, or Firm* — Suiter Swantz IP

(57) ABSTRACT

A mounting system may include a mounting bracket may be configured to house one or more power boxes beneath an aircraft seat. The bracket may include one or more power box mounting holes configured to receive one or more power box mounts configured to mount a power box to the mounting bracket. The bracket may include beam attachment members configured to couple the mounting bracket to the aircraft seat. The bracket may include one or more bridge members. The system may include one or more attachment brackets configured to couple the beam attachment members to beams of the aircraft seat.

20 Claims, 15 Drawing Sheets

(56)             References Cited

U.S. PATENT DOCUMENTS

| | | | |
|---|---|---|---|
| 8,759,674 B2 * | 6/2014 | Korcz | H02G 3/121 |
| | | | 174/53 |
| 9,035,201 B2 * | 5/2015 | Jones | H02G 3/185 |
| | | | 174/487 |
| 9,496,666 B2 * | 11/2016 | Abbinante | B64D 11/0015 |
| 9,573,688 B2 | 2/2017 | Pozzi et al. | |
| 9,682,663 B2 * | 6/2017 | Mozer | B60K 35/00 |
| 9,919,803 B2 | 3/2018 | Pozzi et al. | |
| 10,017,255 B2 | 7/2018 | Smallhorn | |
| 10,538,334 B2 | 1/2020 | Pozzi et al. | |
| 10,632,883 B2 | 4/2020 | Santillan gutierrez et al. | |
| 10,780,807 B1 * | 9/2020 | Colletti | B60N 2/885 |
| 10,946,967 B2 * | 3/2021 | McKee | B64D 11/0605 |
| 2004/0014357 A1 * | 1/2004 | Madera | B60N 2/02 |
| | | | 439/534 |
| 2014/0124259 A1 * | 5/2014 | Dean | H02G 3/08 |
| | | | 174/481 |
| 2018/0152013 A1 * | 5/2018 | Klotz | H02G 3/081 |
| 2019/0061904 A1 * | 2/2019 | Roe | B60R 16/0239 |
| 2020/0378553 A1 * | 12/2020 | Oh | H02G 3/08 |
| 2021/0041059 A1 * | 2/2021 | Witherbee | F16M 13/022 |

* cited by examiner

300

310

312

400

MODULAR POWER BOX MOUNTING SYSTEM

BACKGROUND

Aircraft seats often include in-flight entertainment (IFE) devices for use during flight. Such equipment requires power boxes or supporting hardware (e.g., cabling, wire harnesses, and the like). It is often desirable to mount the power boxes and/or supporting hardware beneath the aircraft seat, however, it is difficult due to the different shroud and bracket designs used across a variety of IFE device supplies. As such, there is a need for a modular electronics box system to be used for attachment of power boxes beneath aircraft seats which cures one or more shortfalls of the previous approaches.

SUMMARY

A mounting system is disclosed, in accordance with one or more embodiments of the present disclosure. In embodiments, the system includes a mounting bracket configured to house one or more power boxes beneath an aircraft seat. In embodiments, the mounting bracket includes one or more power box mounting holes configured to receive one or more power box mounts, where the one or more power box mounts are configured to mount a power box of the one or more power boxes to the mounting bracket. In embodiments, the mounting bracket includes a first beam attachment member including one or more first beam attachment holes, where the first beam attachment member is configured to couple the mounting bracket to a first beam of the aircraft seat via the one or more first beam attachment holes. In embodiments, the mounting bracket includes a second beam attachment member including one or more second beam attachment holes, where the first beam attachment member is arranged a select distance from the second beam attachment member, where the second beam attachment member is configured to couple the mounting bracket to a second beam of the aircraft seat via the one or more second beam attachment holes; one or more bridge members, where the one or more bridge members arranged between the first beam attachment member and the second beam attachment member. In embodiments, the system includes one or more attachment brackets configured to couple the first beam attachment member and the second beam attachment member of the mounting bracket to the first beam and the second beam, where the one or more attachment brackets are configured to couple to the one or more first beam attachment holes and the one or more second beam attachment holes of the mounting bracket.

In some embodiments, the one or more bridge members may be configured to couple to one or more raceways, where the one or more bridge members may include one or more raceway holes.

In some embodiments, the mounting bracket may further include one or more ground stud provisions.

In some embodiments, the system may further include one or more adapter plates, where the mounting bracket may include one or more adapter holes configured to couple the mounting bracket to the one or more adapter plates.

In some embodiments, the one or more power box mounts may include one or more quarter-turn mounts.

In some embodiments, the one or more power box mounting holes may be spaced to accommodate one of a right-hand orientation power box or a left-hand orientation power box.

In some embodiments, the one or more power box mounting holes may be spaced to accommodate a variety of power box models.

In some embodiments, the mounting bracket may be formed of a sheet metal.

In some embodiments, the first beam attachment member and the second beam attachment member may be formed of a metal.

In some embodiments, the first beam attachment member and the second beam attachment member may be formed of a sheet metal.

An aircraft seat base assembly is disclosed, in accordance with one or more embodiments of the present disclosure. In embodiments, the aircraft seat base assembly includes one or more structural beams, where the one or more structural beams include at least a first beam and a second beam; one or more legs coupled to the one or more structural beams. In embodiments, the aircraft seat base assembly includes a modular power box mounting system. In embodiments, the mounting system includes a mounting bracket configured to house one or more power boxes beneath the aircraft seat. In embodiments, the mounting bracket includes one or more power box mounting holes configured to receive one or more power box mounts, where the one or more power box mounts are configured to mount a power box of the one or more power boxes to the mounting bracket. In embodiments, the mounting bracket includes a first beam attachment member including one or more first beam attachment holes, where the first beam attachment member is configured to couple the mounting bracket to the first beam of the aircraft seat via the one or more first beam attachment holes. In embodiments, the mounting bracket includes a second beam attachment member including one or more second beam attachment holes, where the first beam attachment member is arranged a select distance from the second beam attachment member, where the second beam attachment member is configured to couple the mounting bracket to the second beam of the aircraft seat via the one or more second beam attachment holes. In embodiments, the mounting bracket includes one or more bridge members, where the one or more bridge members arranged between the first beam attachment member and the second beam attachment member. In embodiments, the mounting system includes one or more attachment brackets configured to couple the first beam attachment member and the second beam attachment member of the mounting bracket to the first beam and the second beam, where the one or more attachment brackets are configured to couple to the one or more first beam attachment holes and the one or more second beam attachment holes of the mounting bracket.

In some embodiments, the one or more bridge members may be configured to couple to one or more raceways, where the one or more bridge members may include one or more raceway holes.

In some embodiments, the mounting bracket may further include one or more ground stud provisions.

In some embodiments, the system may further include one or more adapter plates, where the mounting bracket may include one or more adapter holes configured to couple the mounting bracket to the one or more adapter plates.

In some embodiments, the one or more power box mounts may include one or more quarter-turn mounts.

In some embodiments, the one or more power box mounting holes may be spaced to accommodate one of a right-hand orientation power box or a left-hand orientation power box.

In some embodiments, the one or more power box mounting holes may be spaced to accommodate a variety of power box models.

In some embodiments, the mounting bracket may be formed of a sheet metal.

In some embodiments, the first beam attachment member and the second beam attachment member may be formed of a metal.

In some embodiments, the first beam attachment member and the second beam attachment member may be formed of a sheet metal.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
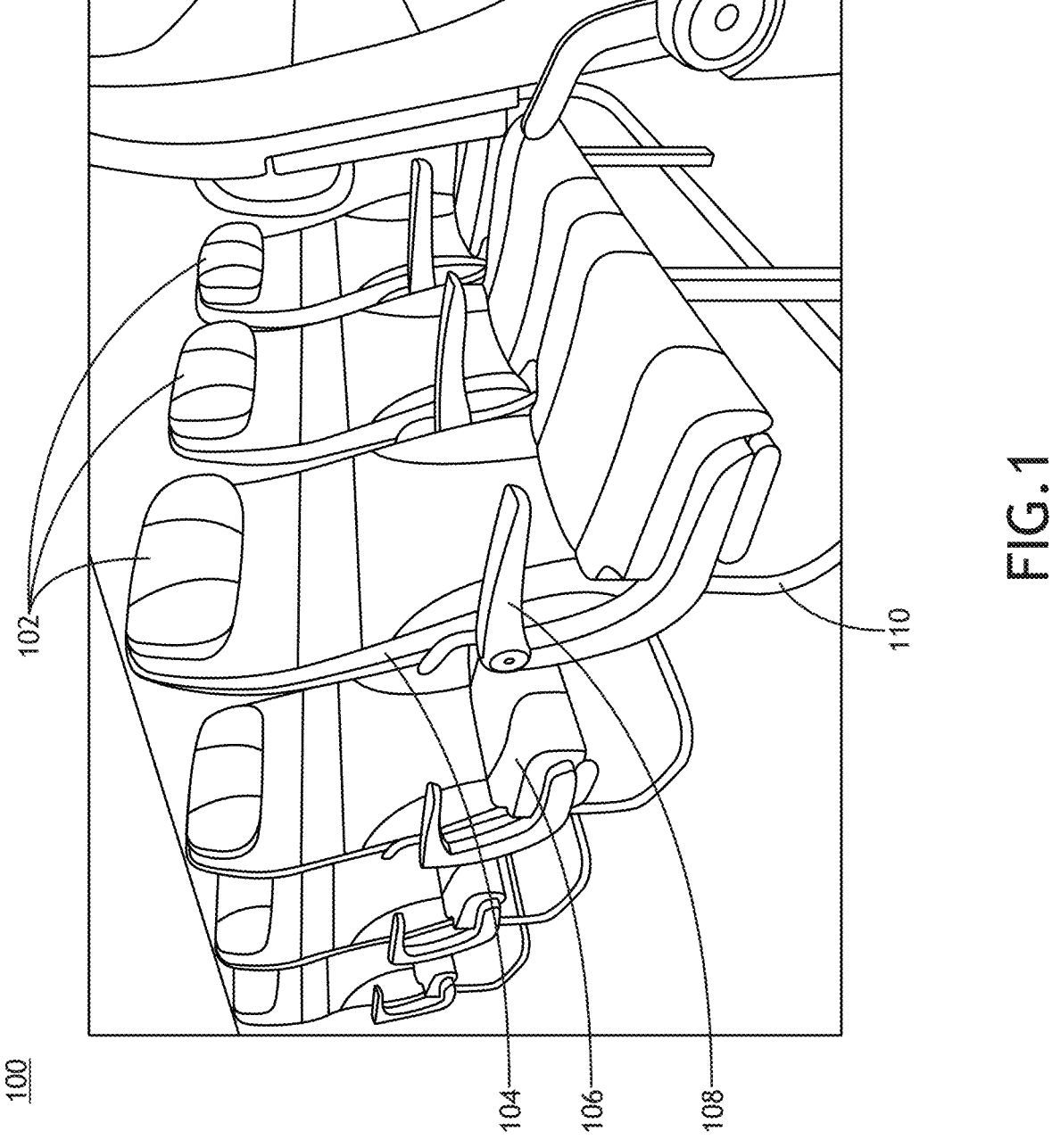
FIG. 1 is a simplified schematic view of an aircraft cabin with an aircraft seat, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-7B in general illustrate a modular power box mounting system for an aircraft seat, in accordance with one or more embodiments of the disclosure.

Aircraft seats often include in-flight entertainment (IFE) devices for use during flight. Such equipment requires power boxes or supporting hardware (e.g., cabling, wire harnesses, and the like). It is often desirable to mount the power boxes and/or supporting hardware beneath the aircraft seat, however, it is difficult due to the different shroud and bracket designs used across a variety of IFE device supplies. As such, there is a need for a modular electronics box system to be used for attachment of power boxes beneath aircraft seats which cures one or more shortfalls of the previous approaches.

As such, there is a need for a modular power box mounting system for aircraft seats, which cures one or more of the shortfalls of previous approaches identified above. The mounting system should allow a variety of power boxes to be mounted beneath the aircraft seat. For example, the mounting system may accommodate power boxes manufactured by a variety of suppliers, where each power box has a different configuration (e.g., shape, size, etc.). The mounting system should allow the power box to be mounted in either a left-hand or right-hand orientation without requiring a separate mounting system specific for the orientation selected.

It is contemplated herein that the mounting system may provide a number of advantages. For example, the mounting system may allow for a consolidation of part numbers, since the mounting system may be adapted for use with a number of power box models/vendors and is not limited to left-hand/right-hand orientations. By way of another example, the mounting system may allow for a more standardized installation method for multiple vendor power boxes across multiple seat platforms/configurations.

It is noted herein that the mounting system may be implemented in any environment or number of environments. For example, the environment may include any type of vehicle known in the art. For instance, the vehicle may be any air, land, or water-based personal equipment or vehicle; any air, land, or water-based commercial equipment or vehicle; any air, land, or water-based military equipment or vehicle known in the art. By way of another example, the environment may include a commercial or industrial establishment (e.g., a home or a business).

Where the environment may be an aviation environment, the aircraft cabin designs need to be certified in accordance with aviation guidelines and standards, while being designed so as not to lose the intended functionality of the structures and/or monuments in the aircraft cabin. For example, the aircraft seats within the aircraft cabin may need to be configured in accordance with aviation guidelines and/or standards put forth by, but not limited to, the Federal Aviation Administration (FAA), the European Aviation Safety Agency (EASA) or any other flight certification agency or organization or any other guidelines agency or organization, or the like.

Figure 2A:
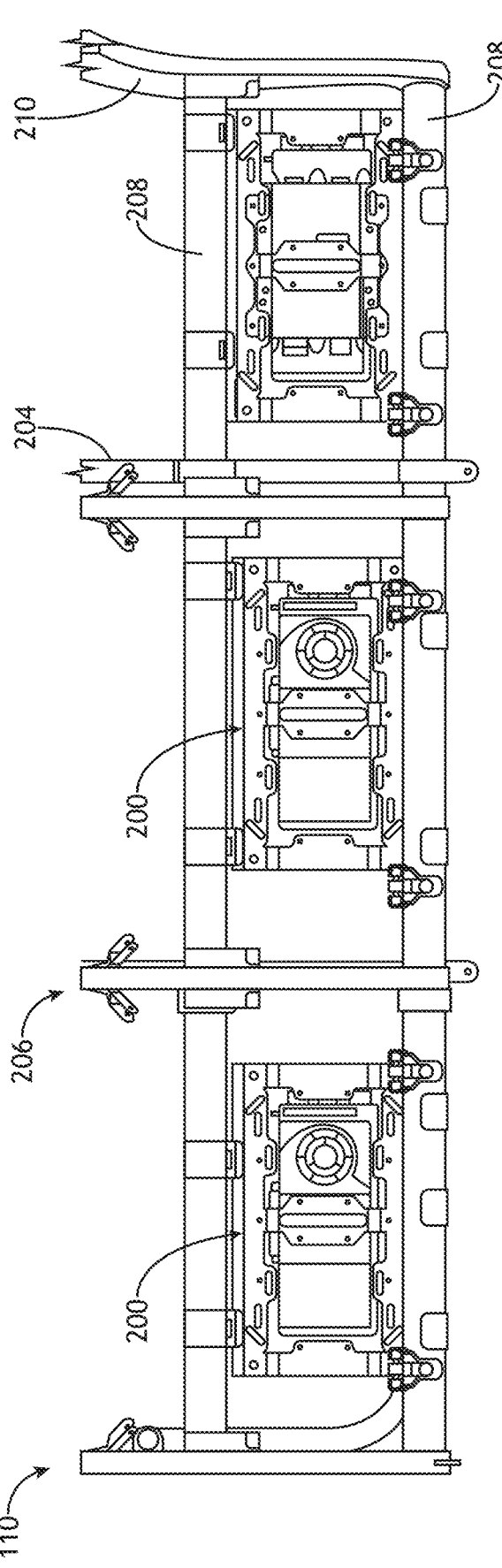
FIG. 2A is a top view of a base assembly of the aircraft seat including a power box mounting system, in accordance with one or more embodiments of the disclosure.
Figure 2B:
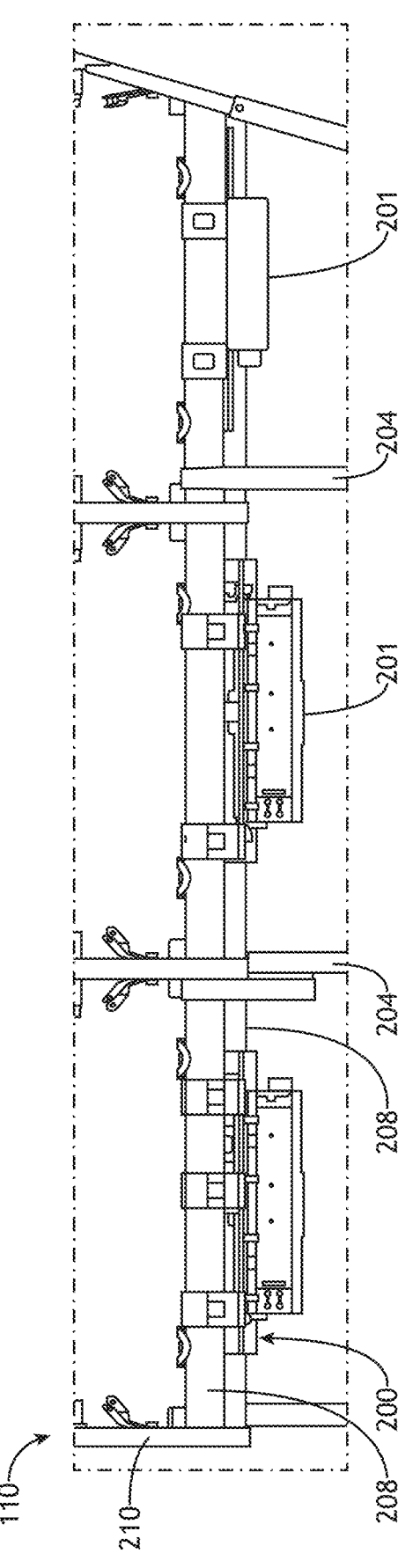
FIG. 2B is a front view of a base assembly of the aircraft seat including a power box mounting system, in accordance with one or more embodiments of the disclosure.

FIG. 1 illustrates an aircraft cabin 100 including an aircraft seat 102, in accordance with one or more embodiments of the disclosure. FIGS. 2A-2B illustrate a base assembly 110 of the aircraft seat 102, in accordance with one or more embodiments of the disclosure.

The aircraft seat 102 may include, but is not limited to, a business class or first-class passenger seat, an economy-class passenger seat, a crew member seat, or the like. It is noted the terms "aircraft seats" and "passenger seats" may be considered equivalent, for purposes of the disclosure.

The aircraft seat 102 may be rotatable about an axis (e.g., swiveleable). The aircraft seat 102 may be fully positionable between the outer limits of motion as defined by the moveable components of the aircraft seat 102. Where the aircraft seat 102 is installed within a passenger compartment, the aircraft seat 102 may be fully positionable between the outer limits of motion as defined by one or more passenger compartment monuments of the passenger compartment. It is noted an upright or raised position may be considered a taxi, takeoff, or landing (TTL) position during select stages of flight (though the upright or raised position is not limited to use during the select stages of flight as the TTL position, but also may be used at any point during the flight), for purposes of the present disclosure. In addition, it is noted that any position that does not meet the above-defined requirements of the TTL position may be considered a non-TTL position, for purposes of the present disclosure. Further, it is noted the aircraft seat 102 may be actuatable (e.g., translatable and/or rotatable) from the TTL position to a non-TTL position, and/or vice versa. Further, it is noted the aircraft seat 102 may be capable of a fully upright or raised position, and that the TTL position may have a more reclined seatback cushion and a more angled upward seat pan cushion as compared to the fully upright or raised position. Therefore, the above description should not be interpreted as a limitation on the present disclosure but merely an illustration.

In general, an aircraft seat 102 may be translatable (e.g., trackable or slidable). The aircraft seat 102 may be rotatable about an axis crosswise through the aircraft seat 102 into a position including, but not limited to, the upright or raised position, one or more lounge or reclined positions, and/or a lie-flat or bed position. For example, the aircraft seat 102 may transition directly between the upright or raised position and the lie-flat or bed position. By way of another example, it is noted the aircraft seat 102 may transition through one or more lounge or reclined positions between the upright or raised position and the lie-flat or bed position. By way of another example, the aircraft seat 102 may transition into one or more lounge or reclined positions in a motion separate from the transition between the upright or raised position and the lie-flat or bed position. Therefore, the above description should not be interpreted as a limitation on the scope of the disclosure but merely an illustration.

The aircraft seat 102 may include a seatback 104. The aircraft seat 102 may include a seat pan 106. The aircraft seat 102 may include one or more arms 108.

The seatback 104 may include a headrest. For example, the headrest may be integrated within the seatback 104. By way of another example, the headrest may be a separate component coupled to (or inserted into) the seatback 104. For instance, the headrest may be movable relative to the seatback frame of the aircraft seat 102 (e.g., adjustable, removable, or the like).

The aircraft seat 102 may be coupled to a base assembly 110. The base assembly 110 may be couplable to a floor of the aircraft cabin 100. For example, the base assembly 110 may be couplable to the floor of the aircraft cabin 100 via one or more tracks (not shown), one or more track covers, and/or one or more floor fittings (or track fasteners).

Referring to FIGS. 2A-2B, the base assembly 110 may include one or more power box mounting systems 200 configured to mount one or more power boxes 201 to the base assembly 110. For example, as shown in FIGS. 2A-2B, each aircraft seat 102 may include a power box mounting system 200. However, it is contemplated herein that a single mount system 200 may be used to provide power to a row of aircraft seats 102 (or a sub-set of aircraft seats within a row). Although FIGS. 1-2B depict the aircraft cabin 100 including a row of aircraft seats 102 including the mounting system, it is noted that FIGS. 1-2B are provided merely for illustrative purposes and shall not be construed as limiting the scope of the present disclosure. For example, the aircraft cabin 100 may include one or more individual aircraft seats 102 including the mounting system.

The base assembly 110 may include one or more legs 204. For example, the base assembly 110 may include one or more front legs and one or more rear legs. The one or more legs 204 may be couplable to one or more portions of the frame 206 of the aircraft seat 102. For example, the one or more legs 204 may be couplable to one or more structural beams 208. For instance, the base assembly may include a first structural beam 208 (e.g., front beam) and a second structural beam 208 (e.g., aft beam). By way of another example, the one or more legs 204 may be couplable to one or more spreaders 210 (e.g., front and/or rear openings). In this regard, the one or more legs 204 may be configured to attach to the one or more structural beams 208 and/or one or more spreaders 210 and secure to the one or more tracks located in the floor of the aircraft cabin via the one or more fittings.

Each mounting system 200 may couple to one or more portions of the one or more structural beams 208 (also known as crossbeams). For example, each mounting system 200 may couple to the first structural beam 208 (e.g., front beam) and the second structural beam 208 (e.g., aft beam), as discussed further herein.

Although FIGS. 2A-2B depict the one or more mounting systems 200 being coupled to the base assembly 110 in a specific location/arrangement, it is contemplated herein that FIGS. 2A-2B are provided merely for illustrative purposes and shall not be construed as limiting the scope of the present disclosure.

Figure 3A:
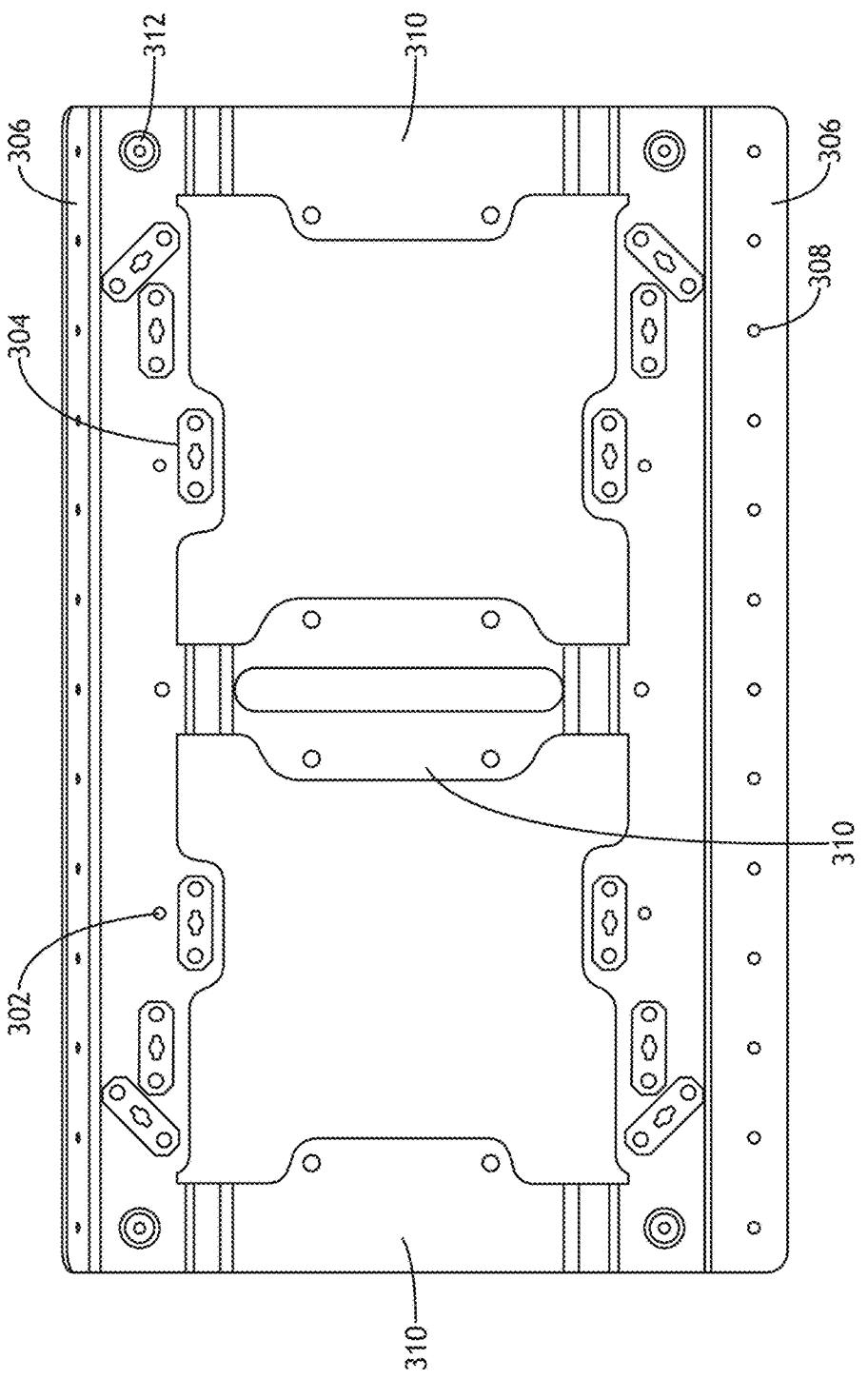
FIG. 3A is top view of a mounting bracket of the power box mounting system, in accordance with one or more embodiments of the disclosure.
Figure 3B:
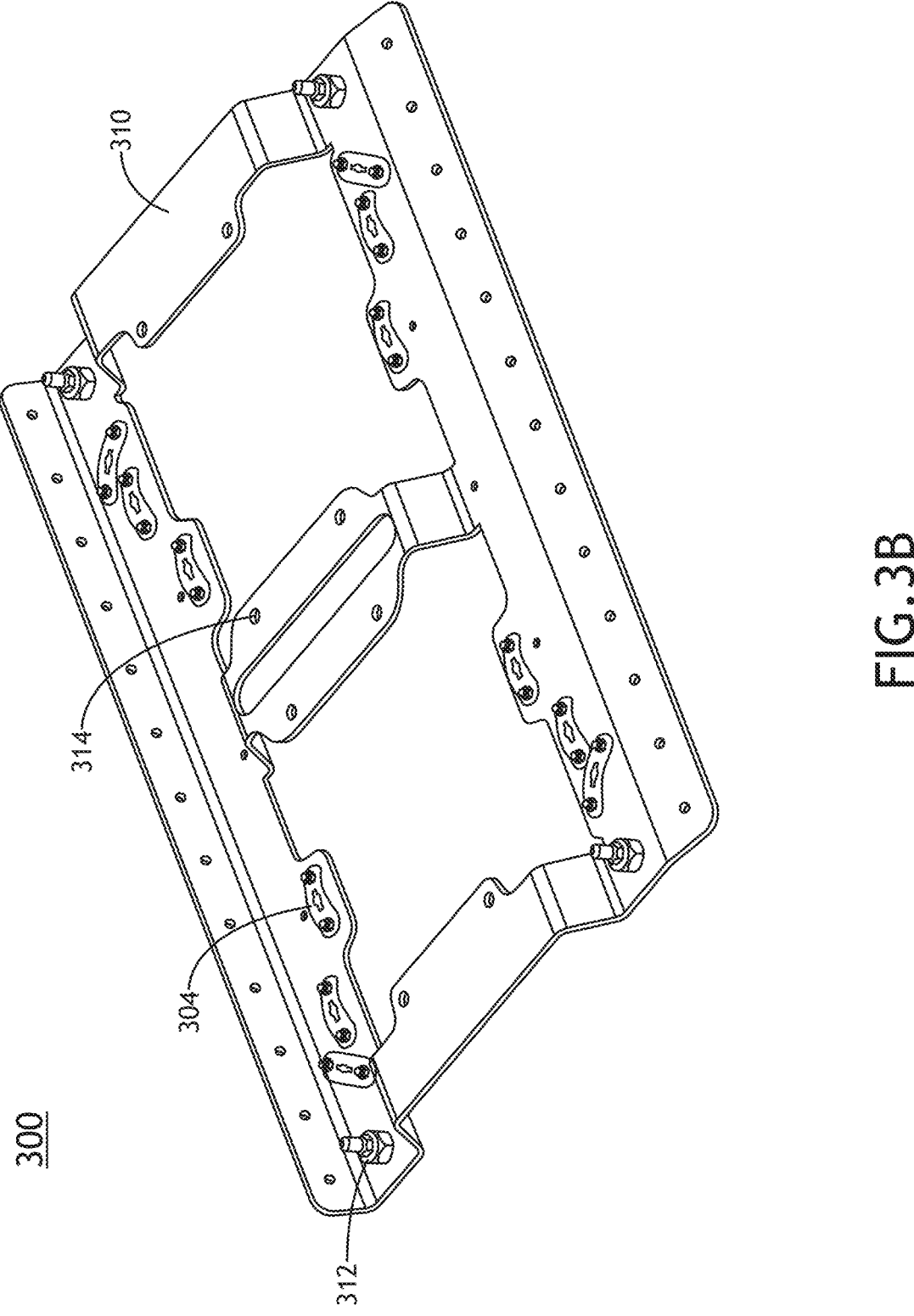
FIG. 3B is a top perspective view of the mounting bracket of the power box mounting system, in accordance with one or more embodiments of the disclosure.
Figure 3C:
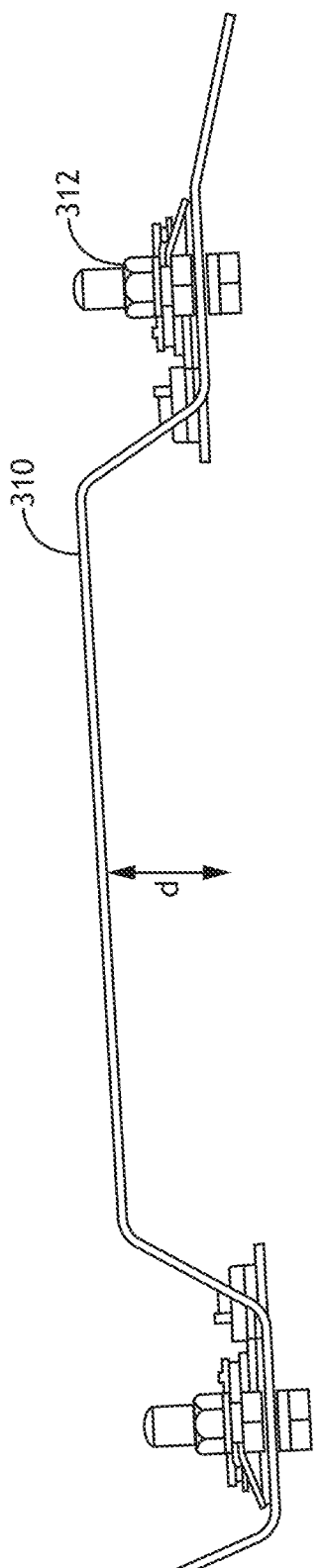
FIG. 3C is a side view of a mounting bracket of the power box mounting system, in accordance with one or more embodiments of the disclosure.

FIGS. 3A-3C illustrate a modular bracket of the mounting system 200, in accordance with one or more embodiments of the disclosure.

Each mounting system 200 may include a mounting bracket 300. For example, the mounting bracket 300 may be configured to house the one or more power boxes 201 beneath an aircraft seat 102.

The mounting bracket 300 may include one or more power box mounting holes 302. For example, the one or more power box mounting holes 302 may be configured to receive one or more power box mounts 304 to couple the power box 201 to the mounting bracket 300. The one or more power box mounts 304 may include one or more quarter-turn mounts. In this regard, the power box 201 may be easily installed/mounted to the mounting bracket 300.

It is contemplated herein that the one or more power box mounting holes 302 may be arranged on the mounting bracket 300 such that the mounting system 200 may be adapted for a variety of power boxes 201. Further, the power box mounting holes 302 may be arranged on the mounting bracket 300 such that the mounting system 200 may be adapted for right-hand and/or left-hand orientations without additional components (or specific left-hand and/or right-hand mounting brackets specific to that orientation).

The mounting bracket 300 may include one or more beam attachment members 306. For example, the one or more beam attachment members 306 may include a first beam attachment member 306 configured to couple to the first beam 208 (e.g., front beam). For instance, the first beam attachment member 306 may include one or more first beam attachment holes 308 configured to receive one or more fasteners to couple the mounting bracket 300 to the first beam 208. By way of another example, the one or more beam attachment members 306 may include a second beam attachment member 306 configured to couple to the second beam 208 (e.g., aft beam). For instance, the second beam attachment member 306 may include one or more second beam attachment holes 308 configured to receive one or more fasteners to couple the mounting bracket 300 to the second beam 208.

The mounting bracket 300 may include one or more bridge members 310. For example, as shown in FIGS. 3B-3C, the one or more bridge members 310 may be positioned a select distance d above a surface of the mounting bracket 300. For instance, as shown in FIG. 3C, the one or more bridge members 310 may be raised by the select distance d, such that the one or more bridge members 310 may adapt to various configurations of power boxes 201, as discussed further herein.

Although FIGS. 3A-3C depict the one or more bridge members 310 being in a specific configuration on the mounting bracket 300, it is contemplated herein that the mounting bracket 300 may include any number, arrangement, and configuration of bridge members 310 suitable for the power boxes 201. Further, it is contemplated that the one or more bridge members 310 may be adjustable via suitable adjusting means, to easily adapt to additional power boxes 201, or the like.

The mounting bracket 300 may include one or more ground studs 312. For example, the mounting bracket 300 may include four ground studs 312 positioned on the four-corners of the mounting bracket 300.

Figure 5A:
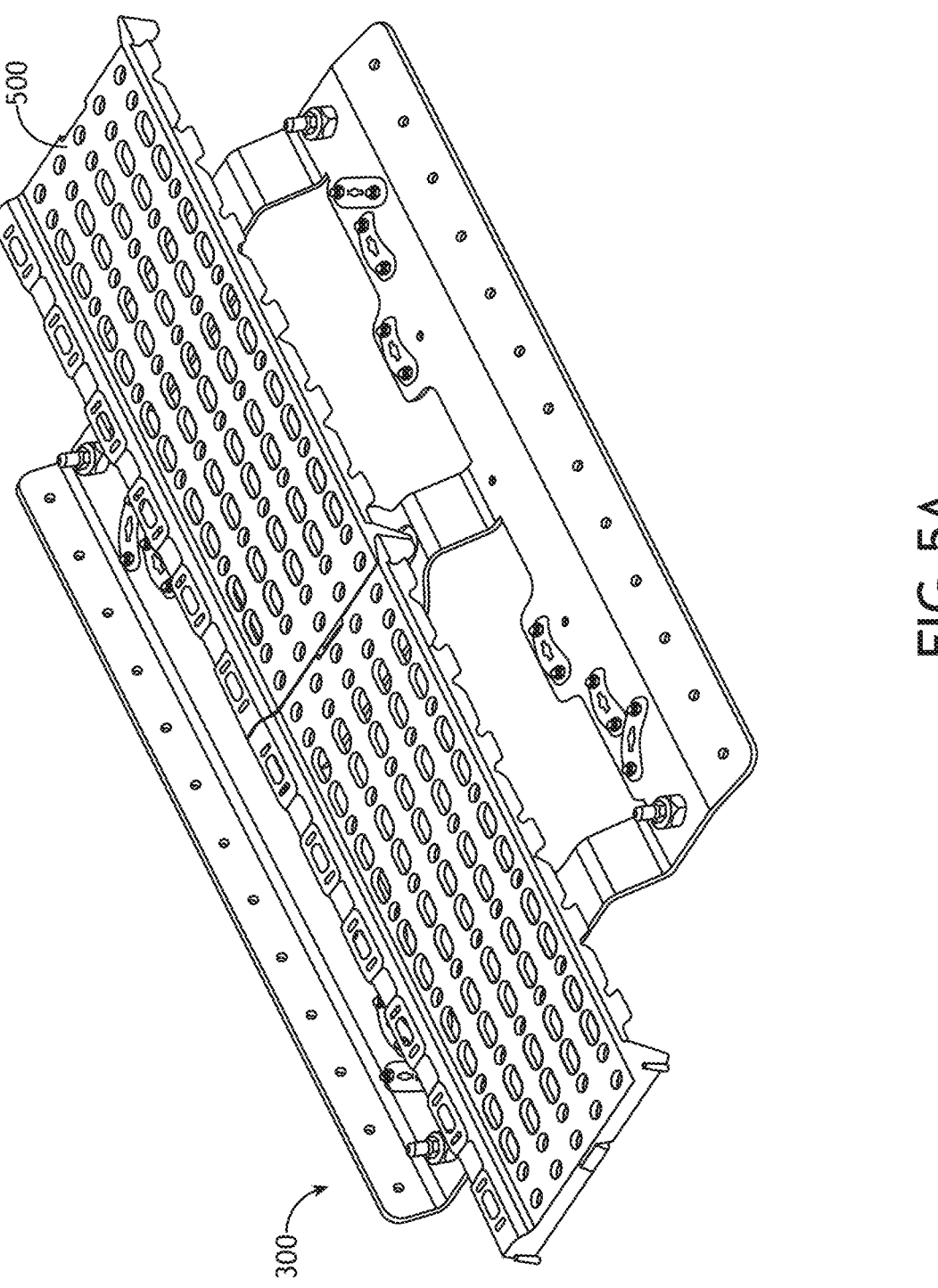
FIG. 5A is a top view of a power box mounted to beams of an aircraft seat using the power box mounting system, in accordance with one or more embodiments of the disclosure.
Figure 5B:
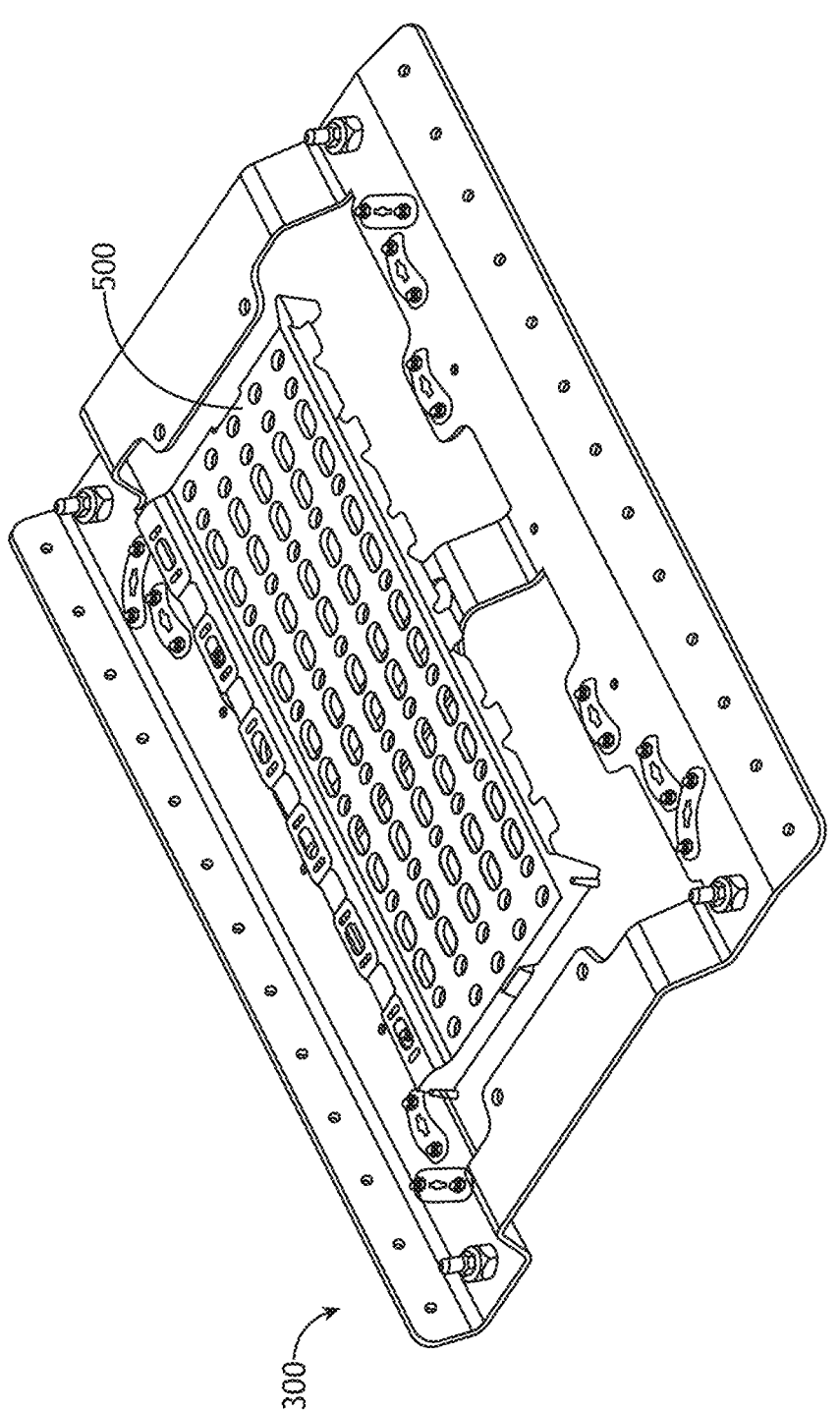
FIG. 5B is a top view of a power box mounted to beams of an aircraft seat using the power box mounting system, in accordance with one or more embodiments of the disclosure.
Figure 5C:
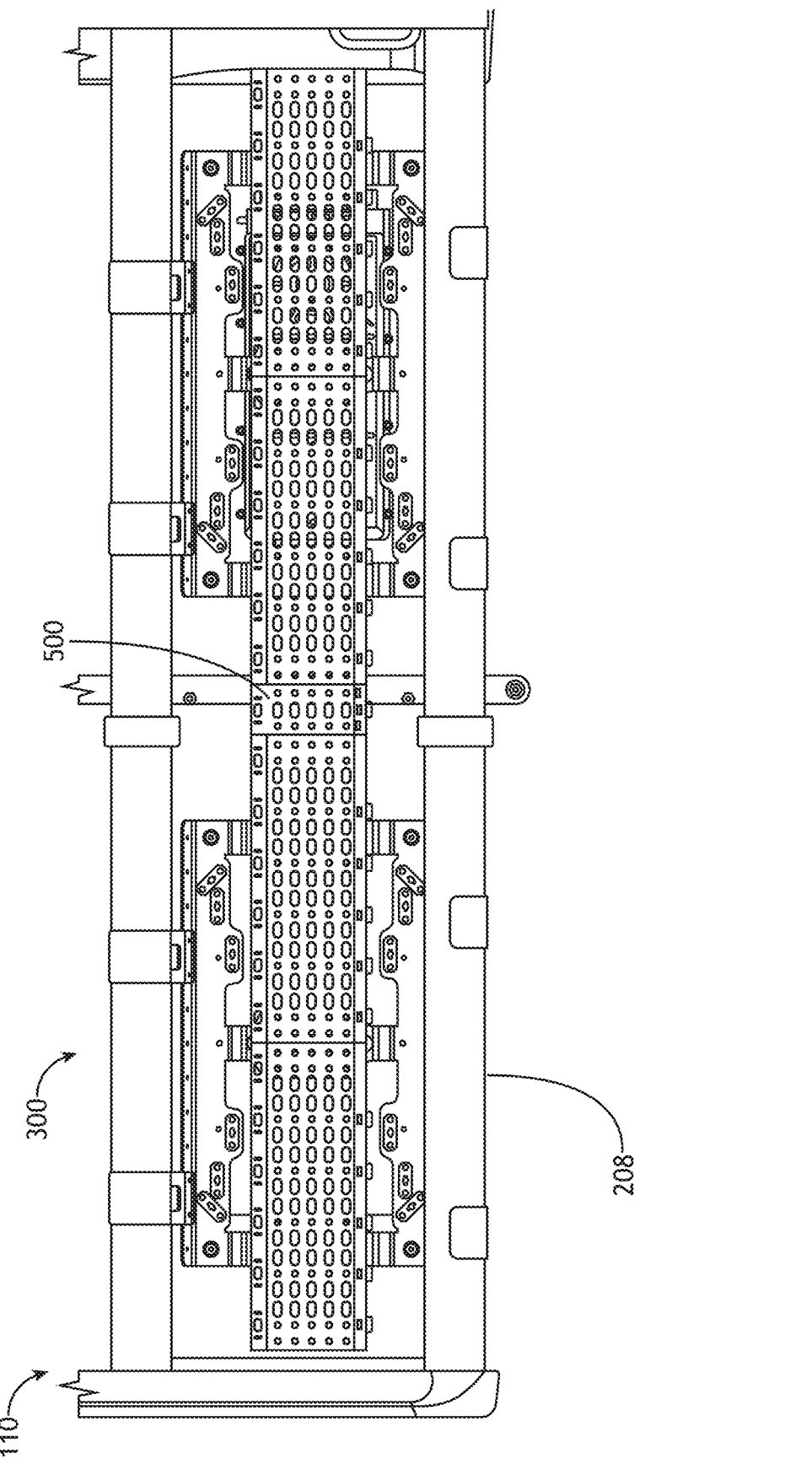
FIG. 5C is a top view of a power box mounted to beams of an aircraft seat using the power box mounting system, in accordance with one or more embodiments of the disclosure.

Referring to FIGS. 5A-5C, the mounting bracket 300 may be configured to couple to one or more harness routing members 500. For example, the one or more bridge members 310 may include one or more harness routing holes 314. The one or more harness routing members 500 may be used for wiring/cables or the like used with the power box 201.

Figure 4:
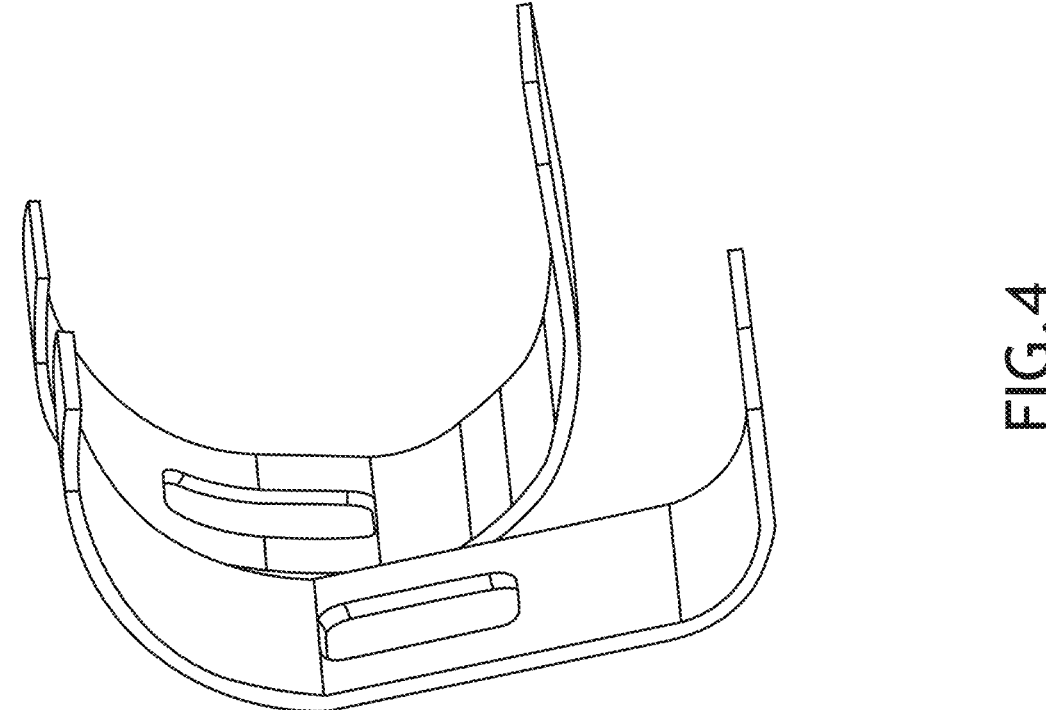
FIG. 4 is a side view of one or more attachment brackets of the power box mounting system, in accordance with one or more embodiments of the disclosure.

FIG. 4 illustrates one or more attachment brackets 400, in accordance with one or more embodiments of the disclosure.

Each mounting system 200 may include one or more attachment brackets 400. For example, the one or more attachment brackets 400 may be configured to couple the first beam attachment member 306 and the second beam attachment member 306 of the mounting bracket 300 to the first beam 208 and the second beam 208, respectively.

It is contemplated that the one or more attachment brackets 400 may have any length/shape corresponding to the respective structural beams 208 (e.g., circular structural beams 208, non-circular structural beams, and the like). Further, it is contemplated that the one or more attachment brackets 400 may be formed of any suitable material for coupling to any material of structural beams (e.g., metal, metal alloy, composite material, or the like).

Referring again to FIGS. 2A-2B, a first set of attachment brackets 400 arranged in a first position may couple the first beam attachment member 306 to the first beam 208 and a second set of attachment brackets 400 arranged in a second position may couple the second beam attachment member 306 to the second beam 208. For instance, the first set of brackets 400 may wrap around a frontside of the first structural beam 208 and the second set of brackets 400 may wrap around a backside of the second structural beam 208. In this regard, the respective brackets 400 may couple the mounting bracket 300 to the respective beams 208, such that the power box(es) 201 are mounted to the base assembly 110 (e.g., beneath the seat pan).

Figure 6A:
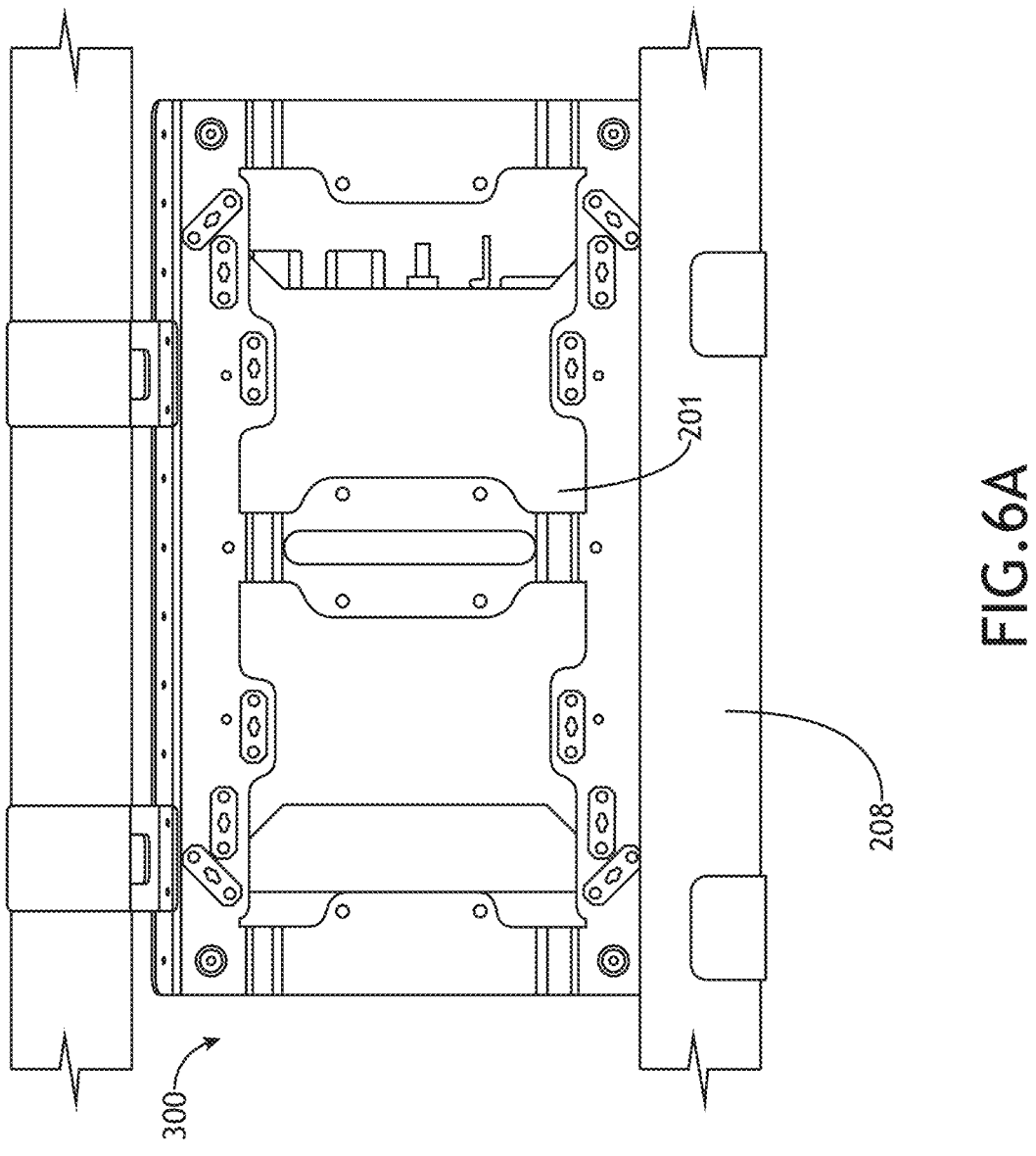
FIG. 6A is a top perspective view of a mounting bracket including a harness routing, in accordance with one or more embodiments of the disclosure.
Figure 6B:
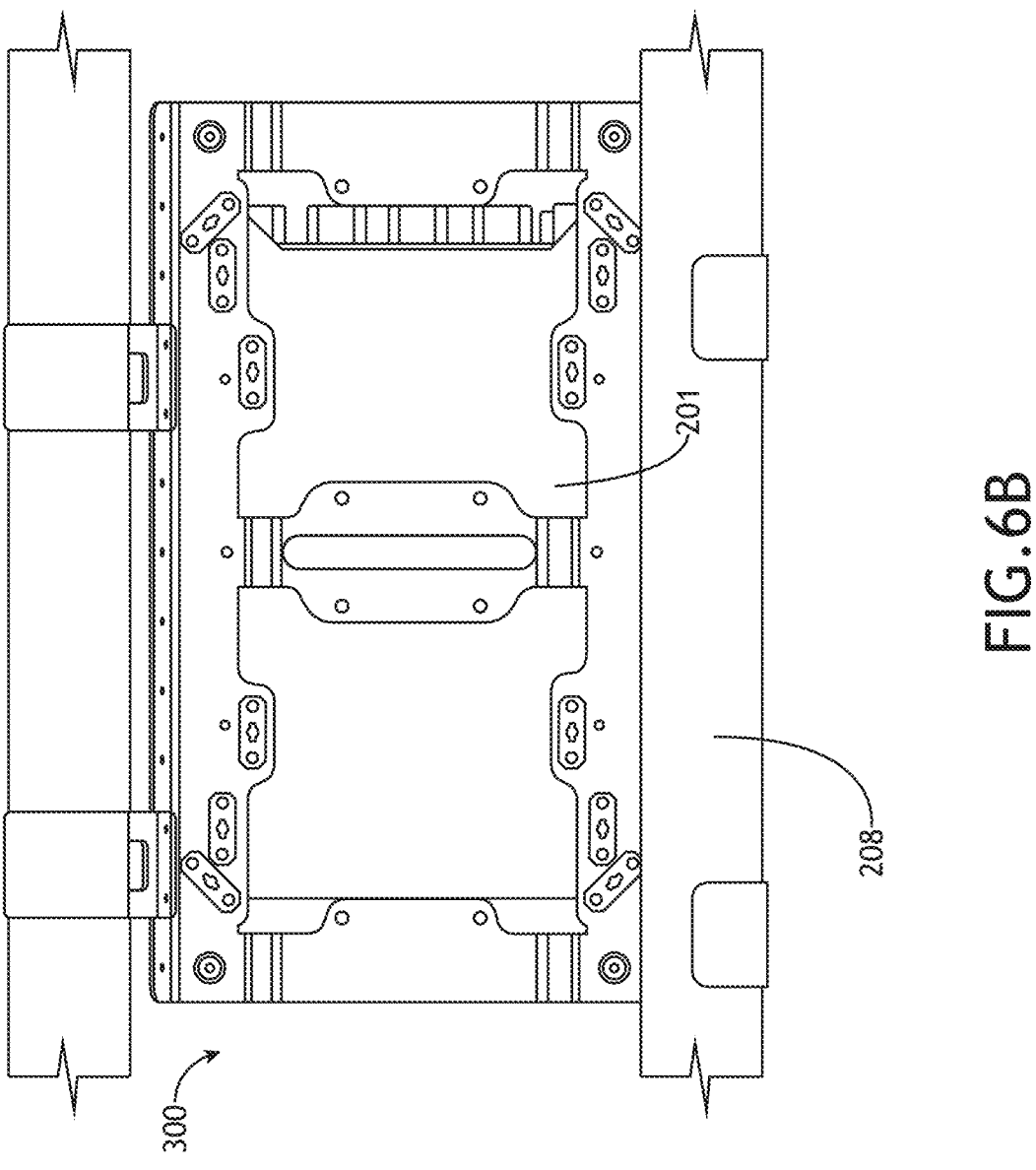
FIG. 6B is a top perspective view of a mounting bracket including a harness routing, in accordance with one or more embodiments of the disclosure.
Figure 6C:
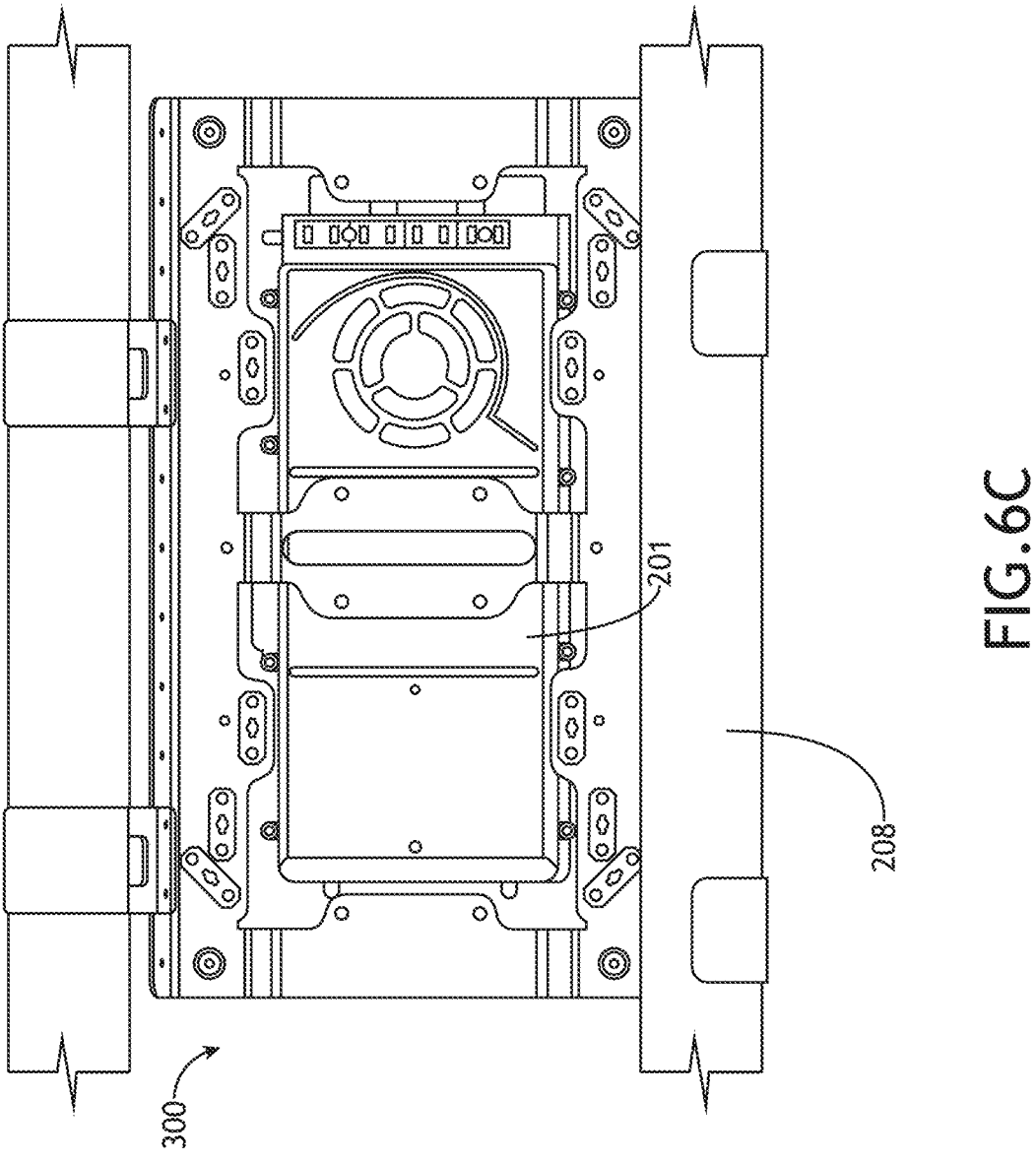
FIG. 6C is a top view of a mounting bracket including a harness routing mounted to beams of an aircraft seat using the power box mounting system, in accordance with one or more embodiments of the disclosure.

Referring to FIGS. 6A-6C, it is contemplated herein that the mounting system 200 may be configured to accommodate a variety of power boxes 201 without the need for power box model specific mounting systems 200 for each respective power box 201. In this regard, as previously discussed herein, the number of parts may be reduced for power box mounting systems.

Referring to FIG. 6A, the mounting system 200 may accommodate a shorter power box 201. Referring to FIGS. 6B-6C the mounting system 200 may further accommodate a longer boxer box 201.

Figure 7A:
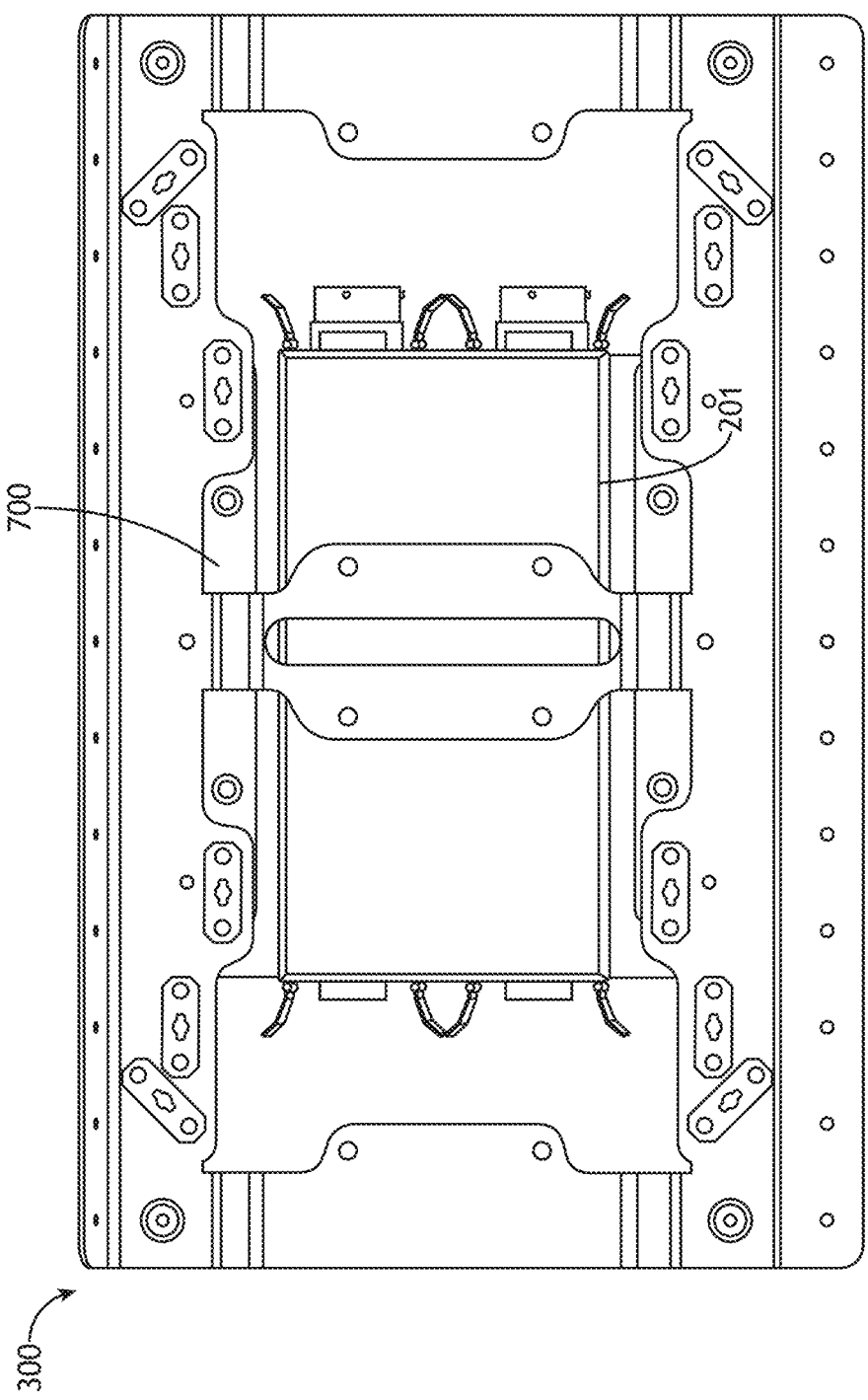
FIG. 7A is a top view of a mounting bracket including one or more adapter plates, in accordance with one or more embodiments of the disclosure.
Figure 7B:
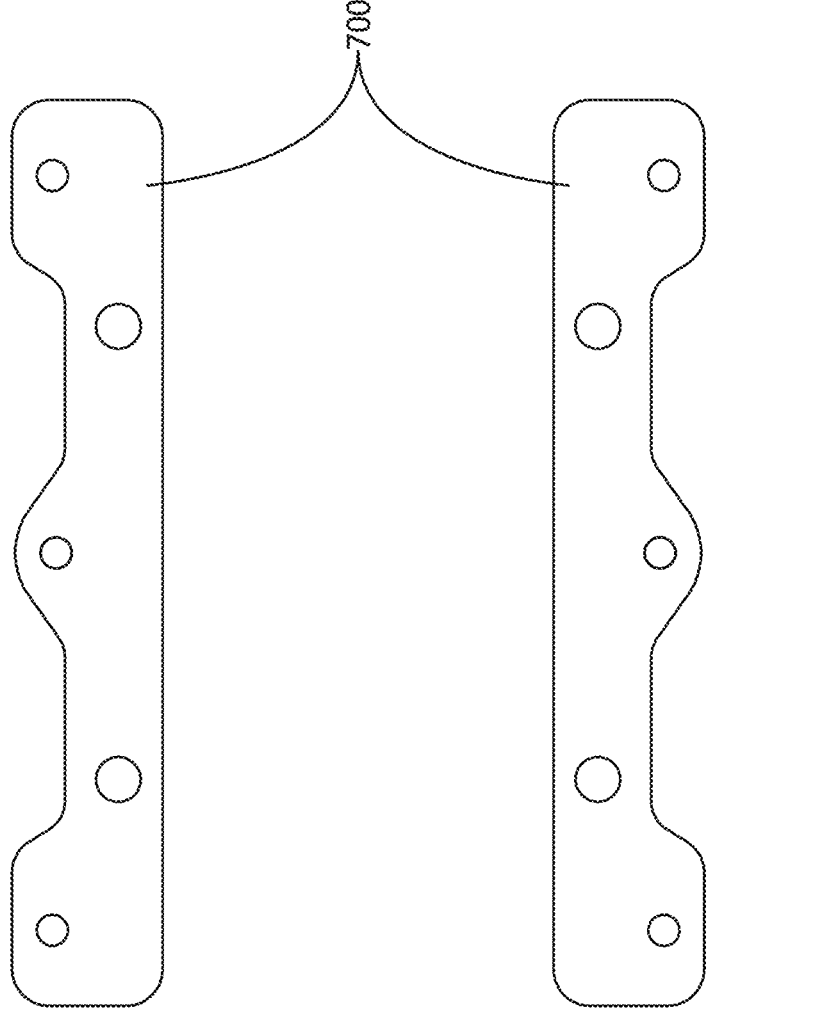
FIG. 7B is a top view of one or more adapter plates, in accordance with one or more embodiments of the disclosure.

Referring to FIGS. 7A-7B, in some instances, the mounting system 200 may include one or more adapter plates 700. For example, the mounting bracket 300 may include one or more adapter plate holes configured to couple to the one or more adapter plates 700. In this regard, the one or more adapter plates 700 may be configured to adapt the mounting bracket 300 such that the mounting bracket 300 may couple to additional power boxes 201, such that the mounting system 200 is able to be easily adapted for future power box 201 designs.

Although FIGS. 7A-7B depict the adapter plates 700 as separate plates 700, it is contemplated herein that adapter plates 700 may be a single piece or plurality of pieces.

It is contemplated herein that one or more components of the modular mounting system 200 may be formed of a variety of materials including, but not limited to, metal (e.g., sheet metal), thermoplastic, composite, or the like.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A mounting system comprising:
   a mounting bracket configured to house one or more power boxes beneath an aircraft seat, wherein the mounting bracket comprises:
      one or more power box mounting holes configured to receive one or more power box mounts, wherein the one or more power box mounts are configured to mount a power box of the one or more power boxes to the mounting bracket;
      a first beam attachment member including one or more first beam attachment holes, wherein the first beam attachment member is in a substantially horizontal plane, wherein the first beam attachment member is configured to couple the mounting bracket to a first beam of the aircraft seat via the one or more first beam attachment holes;
      a second beam attachment member including one or more second beam attachment holes, wherein the second beam attachment member is in a substantially vertical plane, wherein the first beam attachment member is arranged a select distance from the second beam attachment member, wherein the second beam attachment member is configured to couple the mounting bracket to a second beam of the aircraft seat via the one or more second beam attachment holes; and two or more bridge members, wherein the two or more bridge members are arranged between the first beam attachment member and the second beam attachment member, wherein each of the two or more bridge members are positioned a selected distance above a surface of the mounting bracket; and
   one or more attachment brackets configured to couple the first beam attachment member and the second beam attachment member of the mounting bracket to the first beam and the second beam, wherein the one or more attachment brackets are configured to couple to the one or more first beam attachment holes and the one or more second beam attachment holes of the mounting bracket.

2. The mounting system of claim 1, wherein at least one of the two or more bridge members is configured to couple to one or more raceways, wherein the at least one of the two or more bridge members include one or more raceway holes.

3. The mounting system of claim 1, wherein the mounting bracket further comprises:
   one or more ground stud provisions.

4. The mounting system of claim 1, further comprising:
   one or more adapter plates, wherein the mounting bracket comprises one or more adapter holes configured to couple the mounting bracket to the one or more adapter plates.

5. The mounting system of claim 1, wherein the one or more power box mounts comprise one or more quarter-turn mounts.

6. The mounting system of claim 1, wherein the one or more power box mounting holes are spaced to accommodate one of a right-hand orientation power box or a left-hand orientation power box.

7. The mounting system of claim 1, wherein the one or more power box mounting holes are spaced to accommodate a variety of power box models.

8. The mounting system of claim 1, wherein the mounting bracket is formed of a sheet metal.

9. The mounting system of claim 1, wherein the first beam attachment member and the second beam attachment member are formed of a metal.

10. The mounting system of claim 1, wherein the one or more attachment brackets include at least a first set of attachment brackets and a second set of attachment brackets, wherein the first set of attachment brackets wrap around a frontside of the first beam to couple the first beam attachment member to the first beam, wherein the second set of attachment brackets wrap around a backside of the second beam to couple the second beam attachment member to the second beam.

11. An aircraft seat base assembly comprising:
   one or more structural beams, wherein the one or more structural beams include at least a first beam and a second beam;
   one or more legs coupled to the one or more structural beams; and
   a modular power box mounting system comprising:
      a mounting bracket configured to house one or more power boxes beneath the aircraft seat base assembly, wherein the mounting bracket comprises:
         one or more power box mounting holes configured to receive one or more power box mounts, wherein the one or more power box mounts are configured to mount a power box of the one or more power boxes to the mounting bracket;
         a first beam attachment member including one or more first beam attachment holes, wherein the first beam attachment member is in a substantially horizontal plane, wherein the first beam attachment member is configured to couple the mounting bracket to the first beam of the aircraft seat base assembly via the one or more first beam attachment holes;

a second beam attachment member including one or more second beam attachment holes, wherein the second beam attachment member is in a substantially vertical plane, wherein the first beam attachment member is arranged a select distance from the second beam attachment member, wherein the second beam attachment member is configured to couple the mounting bracket to the second beam of the aircraft seat base assembly via the one or more second beam attachment holes; and two or more bridge members, wherein the two or more bridge members are arranged between the first beam attachment member and the second beam attachment member, wherein the two or more bridge members are positioned a selected distance above a surface of the mounting bracket; and one or more attachment brackets configured to couple the first beam attachment member and the second beam attachment member of the mounting bracket to the first beam and the second beam, wherein the one or more attachment brackets are configured to couple to the one or more first beam attachment holes and the one or more second beam attachment holes of the mounting bracket.

12. The aircraft seat base assembly of claim 11, wherein at least one of the two or more bridge members is configured to couple to one or more raceways, wherein the at least one of the two or more bridge members include one or more raceway holes.

13. The aircraft seat base assembly of claim 11, wherein the mounting bracket further comprises:

one or more ground stud provisions.

14. The aircraft seat base assembly of claim 11, further comprising:

one or more adapter plates, wherein the mounting bracket comprises one or more adapter holes configured to couple the mounting bracket to the one or more adapter plates.

15. The aircraft seat base assembly of claim 11, wherein the one or more power box mounts comprise one or more quarter-turn mounts.

16. The aircraft seat base assembly of claim 11, wherein the one or more power box mounting holes are spaced to accommodate one of a right-hand orientation power box or a left-hand orientation power box.

17. The aircraft seat base assembly of claim 11, wherein the one or more power box mounting holes are spaced to accommodate a variety of power box models.

18. The aircraft seat base assembly of claim 11, wherein the mounting bracket is formed of a sheet metal.

19. The aircraft seat base assembly of claim 11, wherein the first beam attachment member and the second beam attachment member are formed of a metal.

20. The aircraft seat base assembly of claim 11, wherein the one or more attachment brackets include at least a first set of attachment brackets and a second set of attachment brackets, wherein the first beam includes a front beam and the second beam includes an aft beam, wherein the first set of attachment brackets wrap around a frontside of the front beam to couple the first beam attachment member to the front beam, wherein the second set of attachment brackets wrap around a backside of the aft beam to couple the second beam attachment member to the aft beam.

* * * * *